Patented Sept. 6, 1938

2,129,141

UNITED STATES PATENT OFFICE 2,129,141

AMINO-ANTHRAQUINONE COMPOUNDS

Georg Kränzlein, Ernst Diefenbach, and Fritz Eggert, Frankfort-on-the-Main-Hochst, Germany, assignors to General Aniline Works, Inc., New York, N. Y., a corporation of Delaware No Drawing. Application December 7, 1935, Serial No. 53,418. In Germany December 7, 1934

4 Claims. (Cl. 260—374)

Our present invention relates to nitrogen-containing anthraquinone compounds.

It is known that anthraquinone compounds of the general formula:

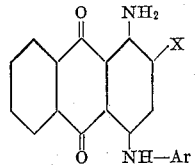

wherein

X stands for H, halogen, $SO_3H$, $CH_3$, CN, COOH and the like and

Ar stands for an unsubstituted or substituted aromatic radical, form, according to the different meanings of X and Ar, blue, green or violet dyestuffs or dyestuff-intermediates, whereas compounds of isomeric constitution, such as, for instance, the following:

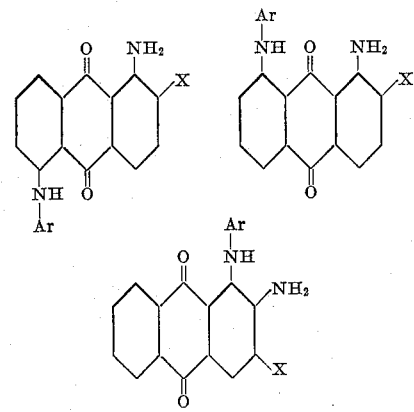

are red or violet-red dyestuffs or intermediates.

According to this invention compounds of beautiful brown tints which are very much demanded in this class of compounds are produced. The new compounds are anthraquinone derivatives which contain an arylido-group (—NH—Ar) in alpha-position, and a free or an alkylated, acylated or arylated amino-group in the aryl of the arylido-group (—NH—Ar) in ortho-position to the NH—group and do not contain free amino-groups in the anthraquinone nucleus itself.

Such anthraquinone compounds may be obtained by condensing an aromatic ortho-diamine of the general formula:

wherein

Ar stands for an unsubstituted or substituted aromatic radical and

R and $R_1$ mean hydrogen alkyl, acyl, aroyl or aryl, with a mono- or di-alpha-halogen-anthraquinone compound containing no free amino group in the anthraquinone nucleus preferably in the presence of copper or a copper compound as well as an acid binding agent and, if desired, sulphonating the products thus obtained. The substances thus obtained are valuable dyestuffs for wool and silk and may also be used as intermediate products for the manufacture of other dyestuffs. They are new. There are, for instance, obtained compounds of the general formula:

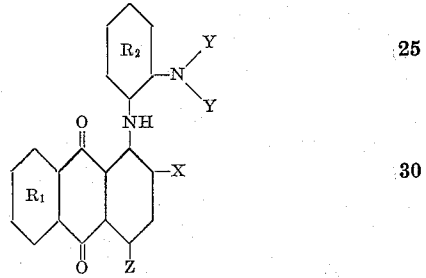

wherein

X means a sulfonic or carboxylic acid group,

Y means hydrogen, alkyl, aryl or acyl,

Z means hydrogen, halogen or an alkylamino or arylamino group, the nucleus $R_1$ may contain substituents with the exception of free amino groups and the nucleus $R_2$ may contain substituents or a further benzene nucleus condensed in two of its ortho-positions, and the salts of these compounds.

The following examples serve to illustrate the invention, but they are not intended to limit it thereto; the parts are by weight:

1. 39 parts of sodium 1-bromo-anthraquinone-2-sulfonate, 12 parts of ortho-phenylenediamine, 15 parts of calcined sodium carbonate and 1 part of cuprous chloride are together heated, while stirring, in 400 parts of water at 40° C. to 50° C., until the condensation is finished. The product is separated by salting it out or by acidifying the solution in known manner and the solid matter is purified, if desired, by re-precipitation from its solution in dilute sodium carbonate solution.

After drying, a brown powder is obtained which dissolves in water to a brown solution and yields on wool and silk dyeings of beautiful brown shade. Instead of 1-bromo-anthraquinone-2-sulfonic acid there may also be used, with the same result, 1-iodo- or 1-chloro-anthraquinone-2-sulfonic acid.

2. 45 parts of sodium-1-iodo-anthraquinone-2-sulfonate, 22 parts of 1,2-diamino-benzene-4-sulfonic acid, 20 parts of calcined sodium carbonate and 0.5 part of cuprous chloride are stirred in 350 parts of water at room temperature until the solution thus obtained no longer changes its color. The temperature is then raised for a short time to 30° C. to 35° C. and the product is then isolated in the usual manner. A brown substance is thus obtained which is easily soluble in water and dyes animal fiber tints which are similar to those obtainable with the dyestuff of Example 1.

Dyestuffs of similar shade are also obtained by using ortho-toluylene-diamine, methoxy-ortho-phenylene diamine and the like.

3. By substituting in Example 2 for the 1,2-diamino-benzene-4-sulfonic acid 20 parts of 1,2-naphthylenediamine or 28 parts of 1,2-naphthylene-diamine-5-sulfonic acid, there are obtained dyestuffs which yield tints of violet brown shades.

4. 35 parts of sodium 1-chlor-anthraquinone-2-sulfonate, 20 parts of ortho-amino-acetanilide, 20 parts of sodium bicarbonate and 1 part of cuprous chloride, are together stirred at 50° C. to 60° C. in 450 parts of water until the reaction is finished. After the usual working up, a dyestuff is obtained which dyes animal fibre full brown-red tints.

The same dyestuff is obtained by treating the condensation product of Example 1 with an acetylating agent.

By using in the preceding example instead of ortho-aminoacetanilide the equivalent quantity of ortho-aminodimethylaniline or ortho-amino-monomethylaniline a dyestuff is obtained dyeing brown shades of a violet hue. By using ortho-aminodiphenylamine sulfonic acid dyestuffs of reddish-brown shades are obtained.

5. 41 parts of potassium 1-nitro-5-broman-thraquinone-6-sulfonate, 13 parts of ortho-phenylene-diamine, 10 parts of calcined sodium carbonate and 1 part of cuprous chloride are together stirred at 70° C. to 75° C. in 500 parts of water until the condensation product has completely separated. It is isolated by filtering with suction and purified by re-precipitating it from dilute sodium carbonate solution. The dyestuff obtained yields nearly the same tint as the dyestuff described in Example 1.

Similar results are obtained by condensing ortho-phenylenediamine with 1-bromo-8-nitro-anthraquinone-2-sulfonic acid which is formed as by-product in the nitration of 1-bromanthra-quinone-2-sulfonic acid. Also in this case the ortho-phenylenediamine may be exchanged for other derivatives which are mono- or di-substituted in the benzene nucleus or in one of its $NH_2$-groups.

6. 27 parts of 1-chloranthraquinone-2-carboxylic acid, 26 parts of sodium 1,2-diamino-benzene-4-sulfonate, 21 parts of calcined sodium carbonate, 500 parts of water and 1 part of cuprous chloride are heated, while stirring, at 60° C. to 70° C. until the reaction is finished. After purification, a dyestuff is obtained which dyes wool and silk beautiful neutral brown tints.

7. 10 parts of sodium 1-iodo-4-bromo-anthra-quinone-2-sulfonate, 100 parts of water, 4 parts of calcined sodium carbonate, 4 parts of ortho-phenylenediamine and 0.3 part of cuprous chloride are heated together while stirring, at 25° C. to 30° C. When the sodium 1-(ortho-amino)-anilido-4-bromo-anthraquinone-2-sulfonate has separated completely, the solid matter is filtered with suction and the compound thus isolated is purified in the usual manner. The product dyes wool and silk beautiful brown tints. By causing the bromine atom in 4-position to react with an aliphatic amine, for instance, methylamine, or an aromatic amine, such as aniline or toluidine there may be obtained from the afore-said compound other valuable dyestuffs dyeing for instance, violet-brown shades. Some of them may also be obtained by causing a 1-halogen-4-arylido-anthraquinone-2-sulfonic acid to react with the above mentioned ortho-phenylenediamine derivatives.

8. 14 parts of potassium 1-iodo-anthraquinone-2-sulfonate, 7 parts of 3,4-diamino-benzoic acid ethyl ester, 4 parts of sodium carbonate and 0.5 part of cuprous chloride in 120 parts of water are stirred at 40° C. to 60° C. until the resulting dyestuff has precipitated in the form of small dark crystals which are filtered with suction. If desired, the dyestuff may be purified by recrystallizing it from water. It dyes wool and silk brown shades.

9. 14 parts of potassium 1-iodo-anthraquinone-2-sulfonate, 10 parts of 4,5-diamino-2-chloro-toluene, 4 parts of sodium carbonate and 0.5 part of cuprous chloride are heated, while stirring, in 120 parts of water at 60° C., the reaction product precipitating in a crystalline form. It is filtered with suction while still hot, the residue is dissolved in very dilute aqueous ammonia and salted out with a dilute solution of sodium chloride. A red-brown powder is obtained which dyes wool and silk brown shades.

10. To a mixture of 14 parts of potassium 1-iodo-anthraquinone-2-sulfonate and 4 parts of sodium carbonate in 120 parts of water there is added a solution of 6 parts of 3,4-diamino-1-chlorobenzene in 15 parts of methyl alcohol and 0.5 part of cuprous chloride. The whole is heated, while stirring, at 40° C. to 45° C. until the condensation product has precipitated in the form of small brown crystals. The whole is allowed to cool, diluted with water, filtered with suction and the solid subsequently washed with cold water. The product dyes wool and silk fast brown tints.

11. 14 parts of potassium 1-iodo-anthraqui-none-2-sulfonate, 7 parts of 1,2-diamino-4,5-di-chlorobenzene, 4 parts of sodium carbonate and 0.5 part of cuprous chloride are heated for 1 hour, while stirring, at 55° C. to 60° C. in a mixture of 120 parts of water and 25 parts of methyl alcohol, the reaction product precipitating in the form of red needles. After cooling the product is filtered with suction and washed with a dilute solution of sodium chloride. The product may, if desired, be purified by dissolving it in water and salting out with sodium chloride. The dyestuff dyes wool and silk fast brown tints.

We claim:

1. The members of the group consisting of compounds of the general formulae:

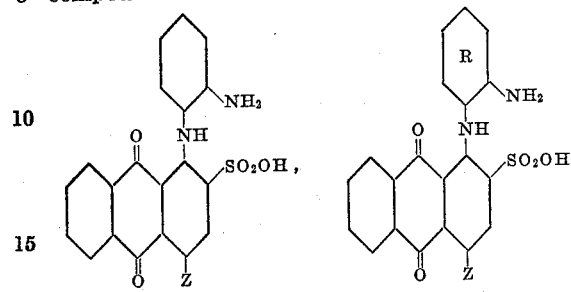

and

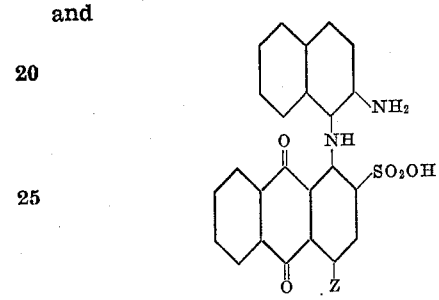

wherein the nucleus R contains at least one substituent of the group consisting of carboxylic ester, sulfonic acid, methyl, methoxy and chlorine, and Z means a member of the group consisting of hydrogen, halogen, alkylamino and arylamino, and the salts thereof, dyeing wool and silk brown tints.

2. The compound of the formula

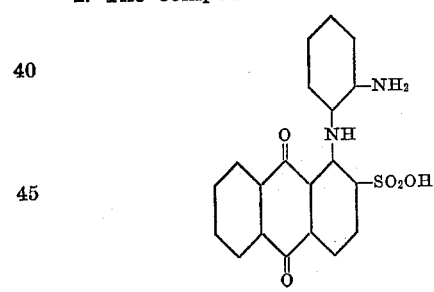

and the salts thereof, being a brown powder which dissolves in water to a brown solution and yields on wool and silk dyeings of beautiful brown shade.

3. The compound of the formula

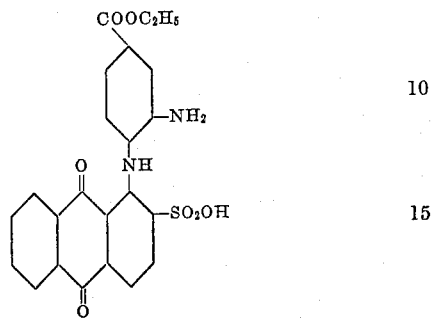

and the salts thereof, being a brown powder which dissolves in water to a brown solution and yields on wool and silk dyeings of beautiful brown shade.

4. The compound of the formula

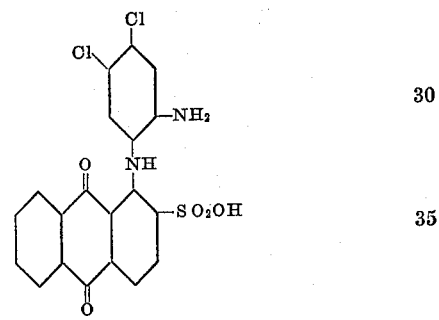

and the salts thereof, dyeing wool and silk fast brown tints.

GEORG KRÄNZLEIN.
ERNST DIEFENBACH.
FRITZ EGGERT.